No. 794,433. PATENTED JULY 11, 1905.
C. THIBODEAU.
MACHINE FOR MAKING TUBING.
APPLICATION FILED AUG. 15, 1904.
14 SHEETS—SHEET 1.

No. 794,433. PATENTED JULY 11, 1905.
C. THIBODEAU.
MACHINE FOR MAKING TUBING.
APPLICATION FILED AUG. 15, 1904.

14 SHEETS—SHEET 3.

Witnesses
E. Batchelder
R. Bullock.

Inventor
Charles Thibodeau
by Wright, Brown & Quinby
Attorneys

No. 794,433. PATENTED JULY 11, 1905.
C. THIBODEAU.
MACHINE FOR MAKING TUBING.
APPLICATION FILED AUG. 15, 1904.

14 SHEETS—SHEET 6.

Witnesses:
E. Batchelder
A. Bullock

Inventor
Charles Thibodeau
by Wright Brown & Quinby
Attorneys

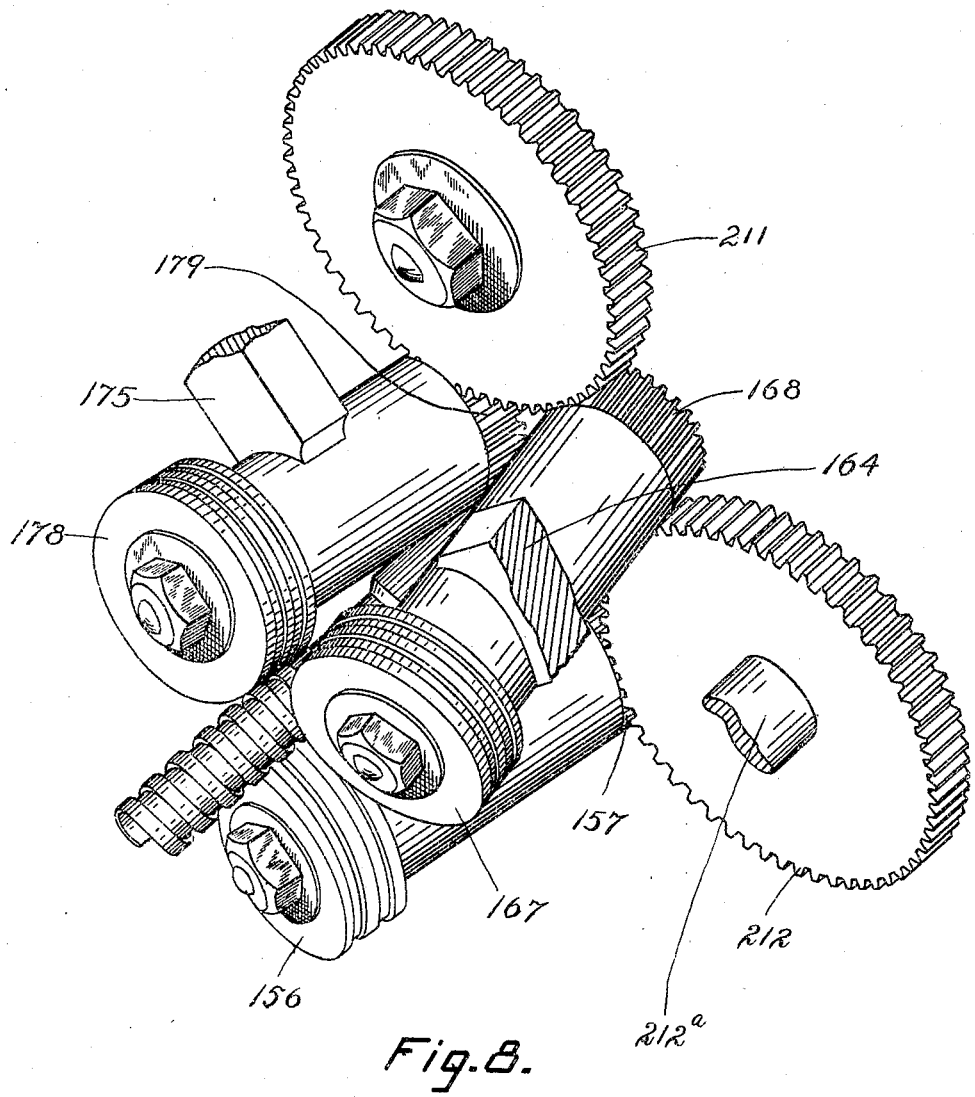

No. 794,433. PATENTED JULY 11, 1905.
C. THIBODEAU.
MACHINE FOR MAKING TUBING.
APPLICATION FILED AUG. 15, 1904.

14 SHEETS—SHEET 9.

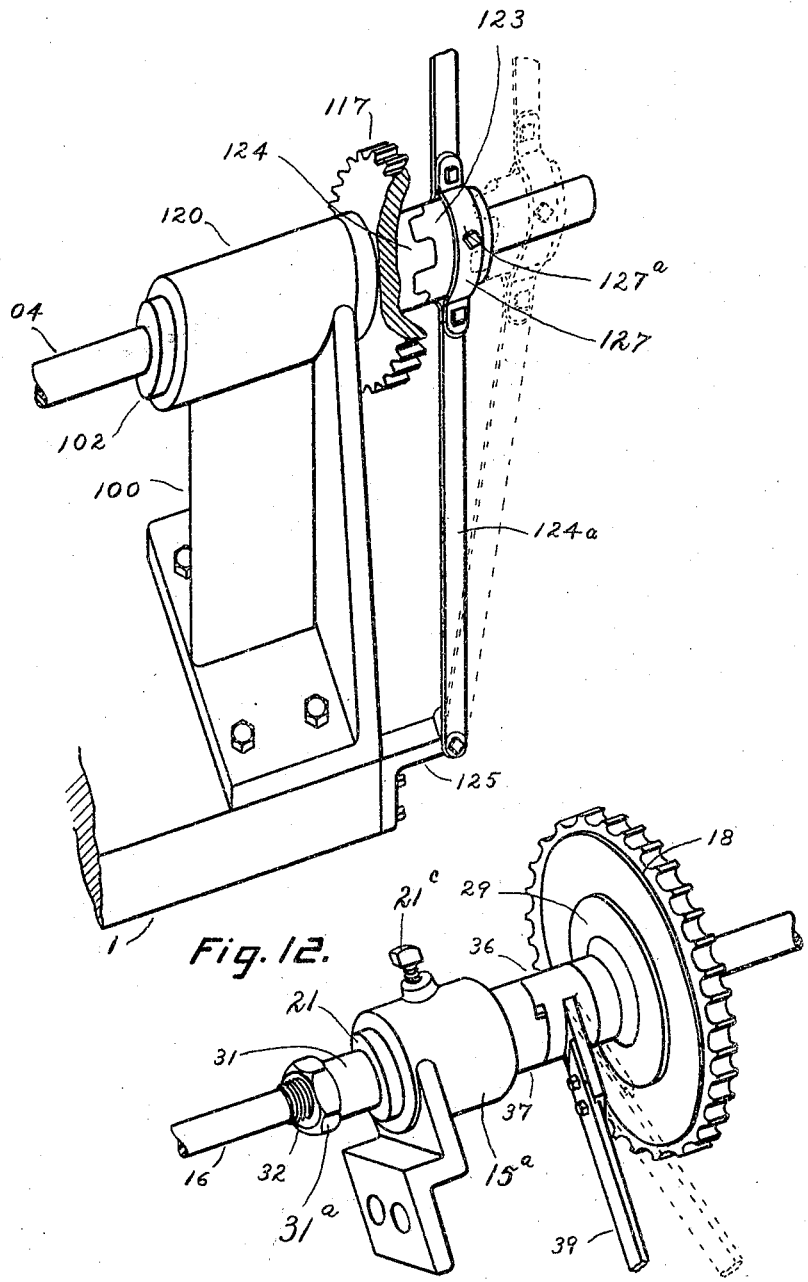

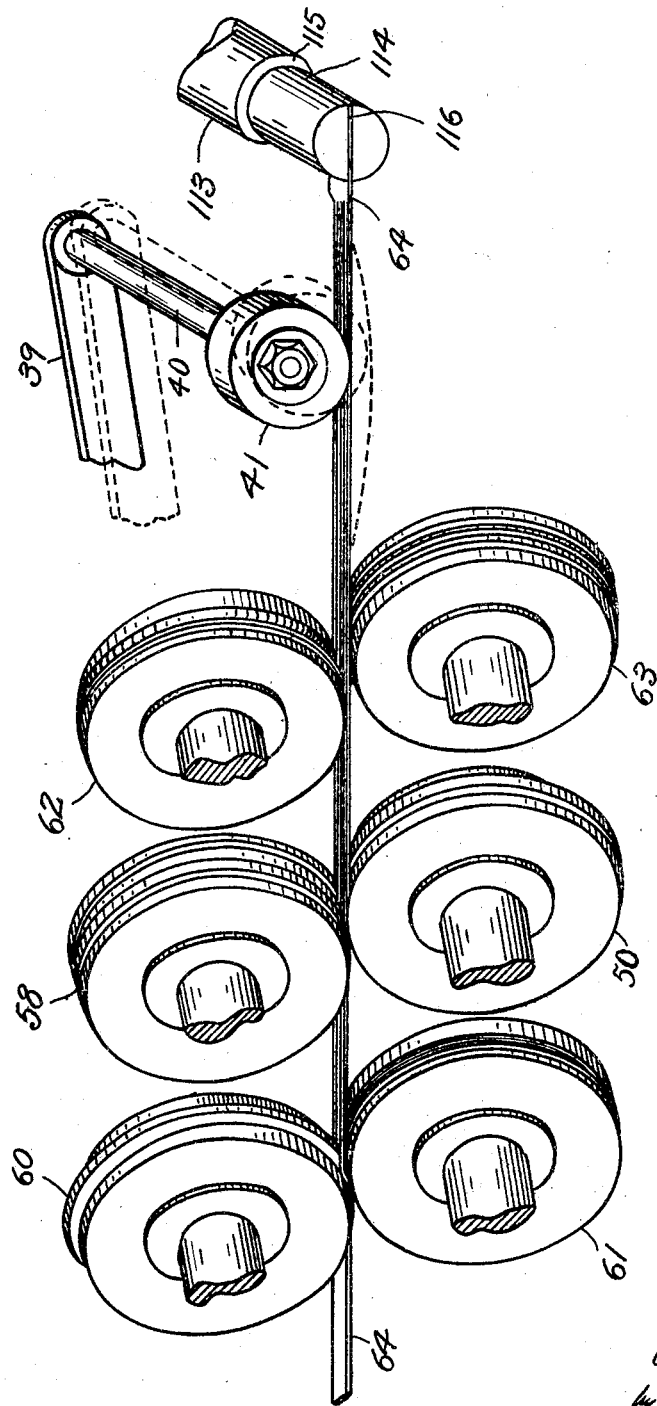

No. 794,433. PATENTED JULY 11, 1905.
C. THIBODEAU.
MACHINE FOR MAKING TUBING.
APPLICATION FILED AUG. 15, 1904.
14 SHEETS—SHEET 12.
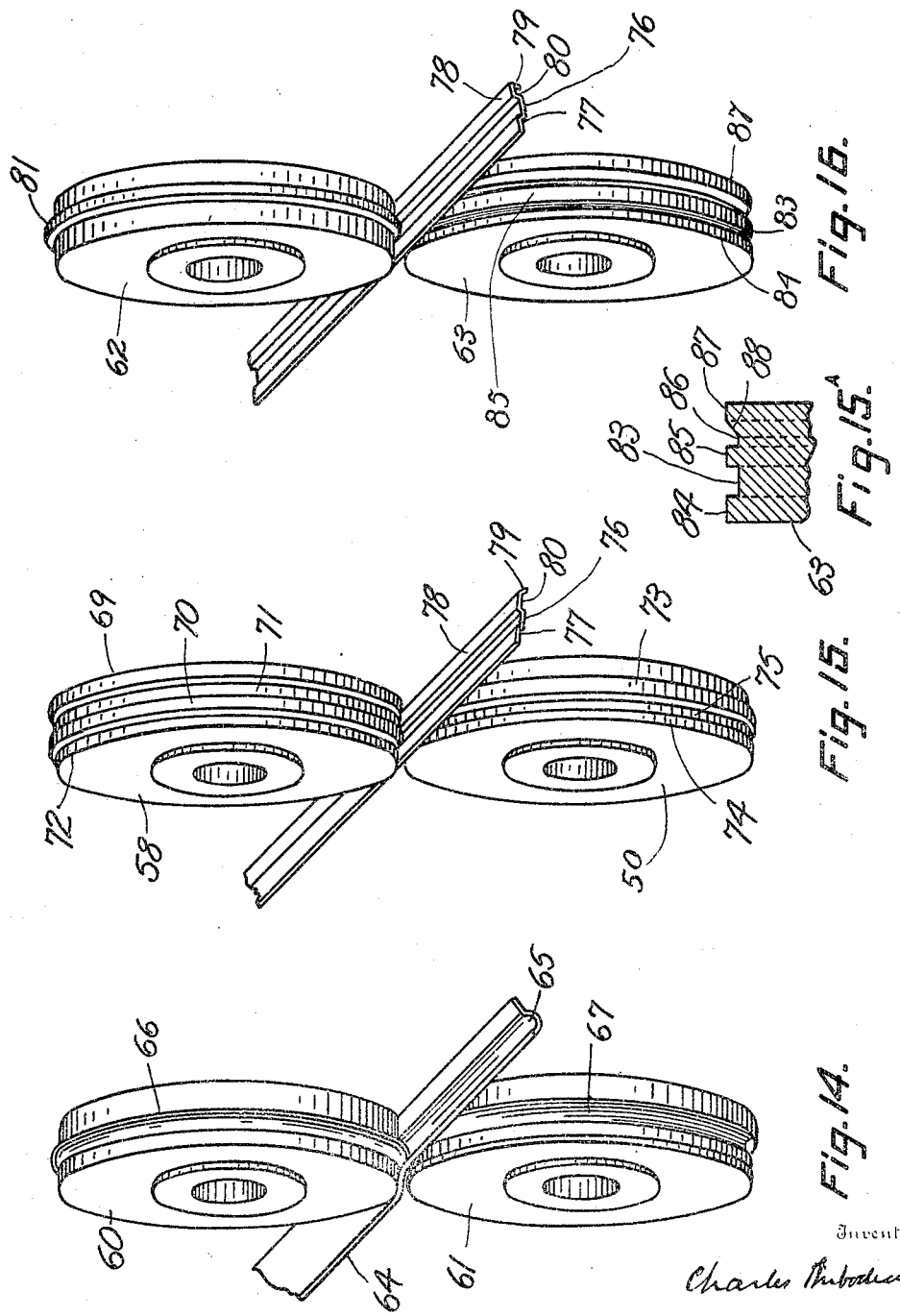

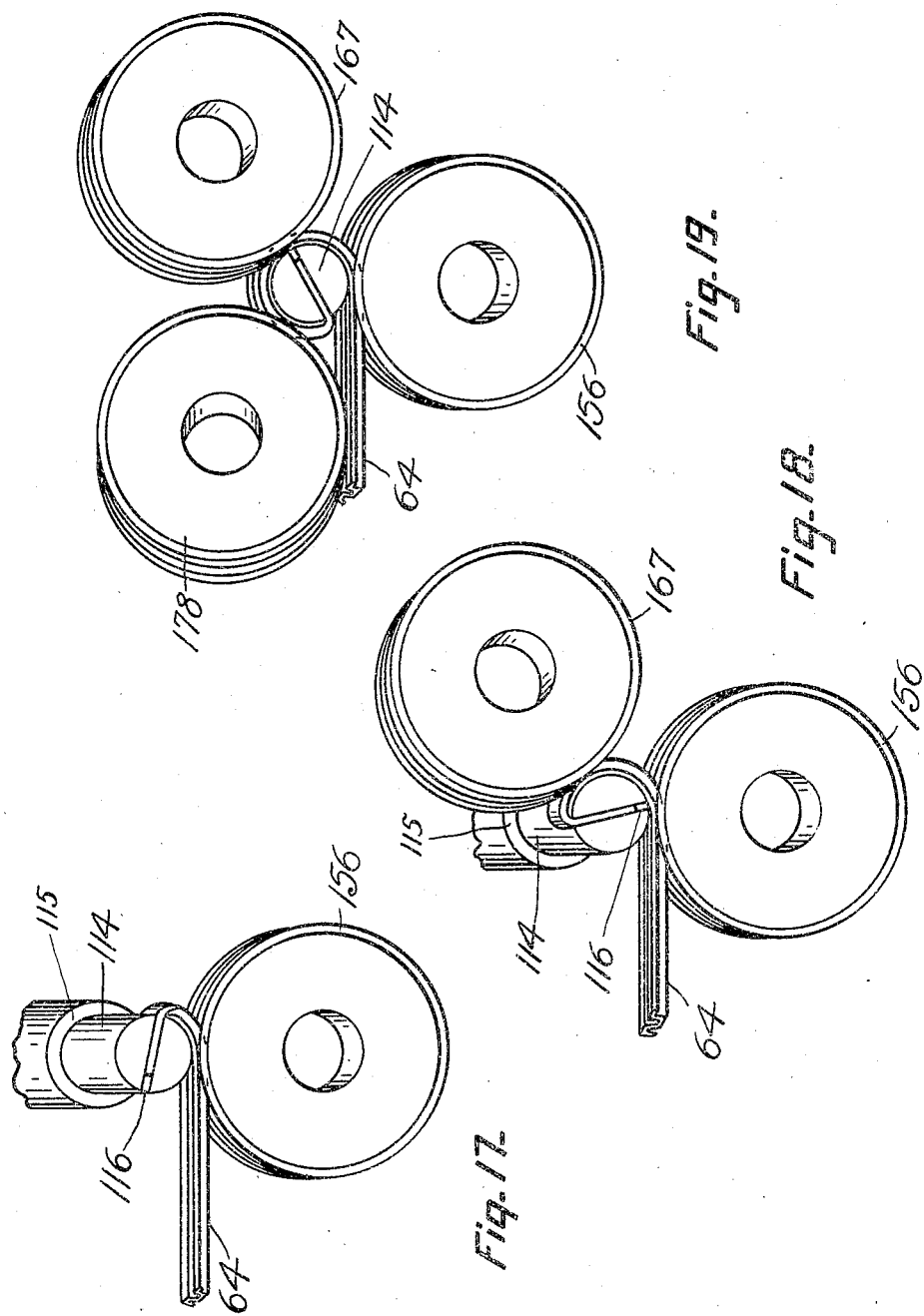

No. 794,433. PATENTED JULY 11, 1905.
C. THIBODEAU.
MACHINE FOR MAKING TUBING.
APPLICATION FILED AUG. 15, 1904.
14 SHEETS—SHEET 14.
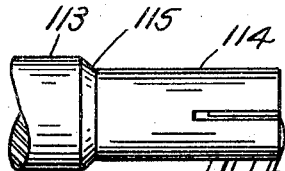
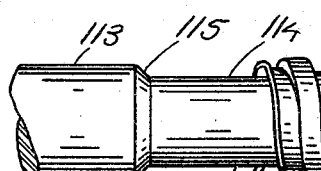
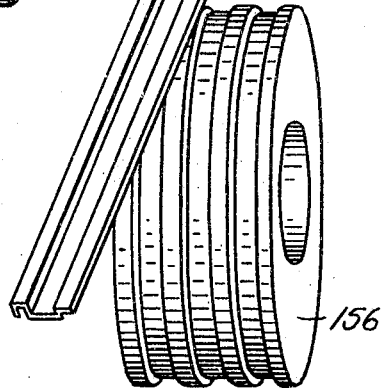
Fig. 20.
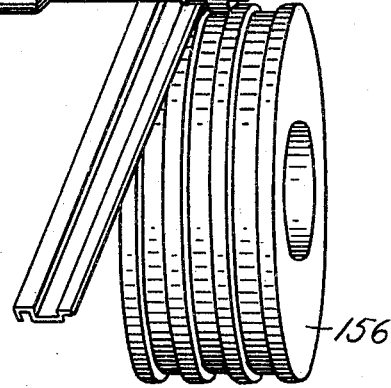
Fig. 21.
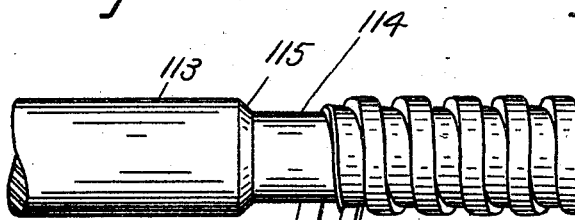
Fig. 22.
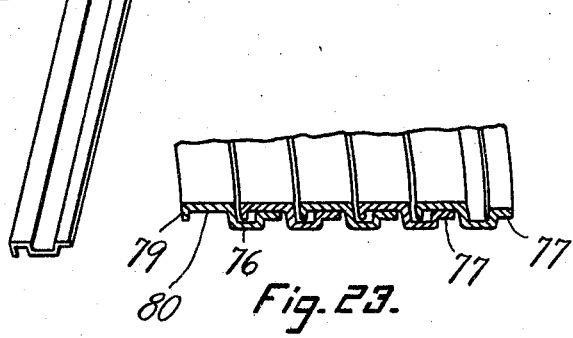
Fig. 23.

No. 794,433. Patented July 11, 1905.

UNITED STATES PATENT OFFICE.

CHARLES THIBODEAU, OF SOMERVILLE, MASSACHUSETTS, ASSIGNOR TO EMMA M. WILSON, OF CHELSEA, MASSACHUSETTS.

MACHINE FOR MAKING TUBING.

SPECIFICATION forming part of Letters Patent No. 794,433, dated July 11, 1905.

Application filed August 15, 1904. Serial No. 220,751.

*To all whom it may concern:*

Be it known that I, CHARLES THIBODEAU, of Somerville, in the county of Middlesex and State of Massachusetts, have invented certain new and useful Improvements in Machines for Making Tubing, of which the following is a specification.

The object of my invention is to produce an automatic machine for making that form of metallic tube, that is composed of a relatively narrow strip or welt turned upon itself in the form of a spiral whose contiguous convolutes are interlocked.

Figure 1:
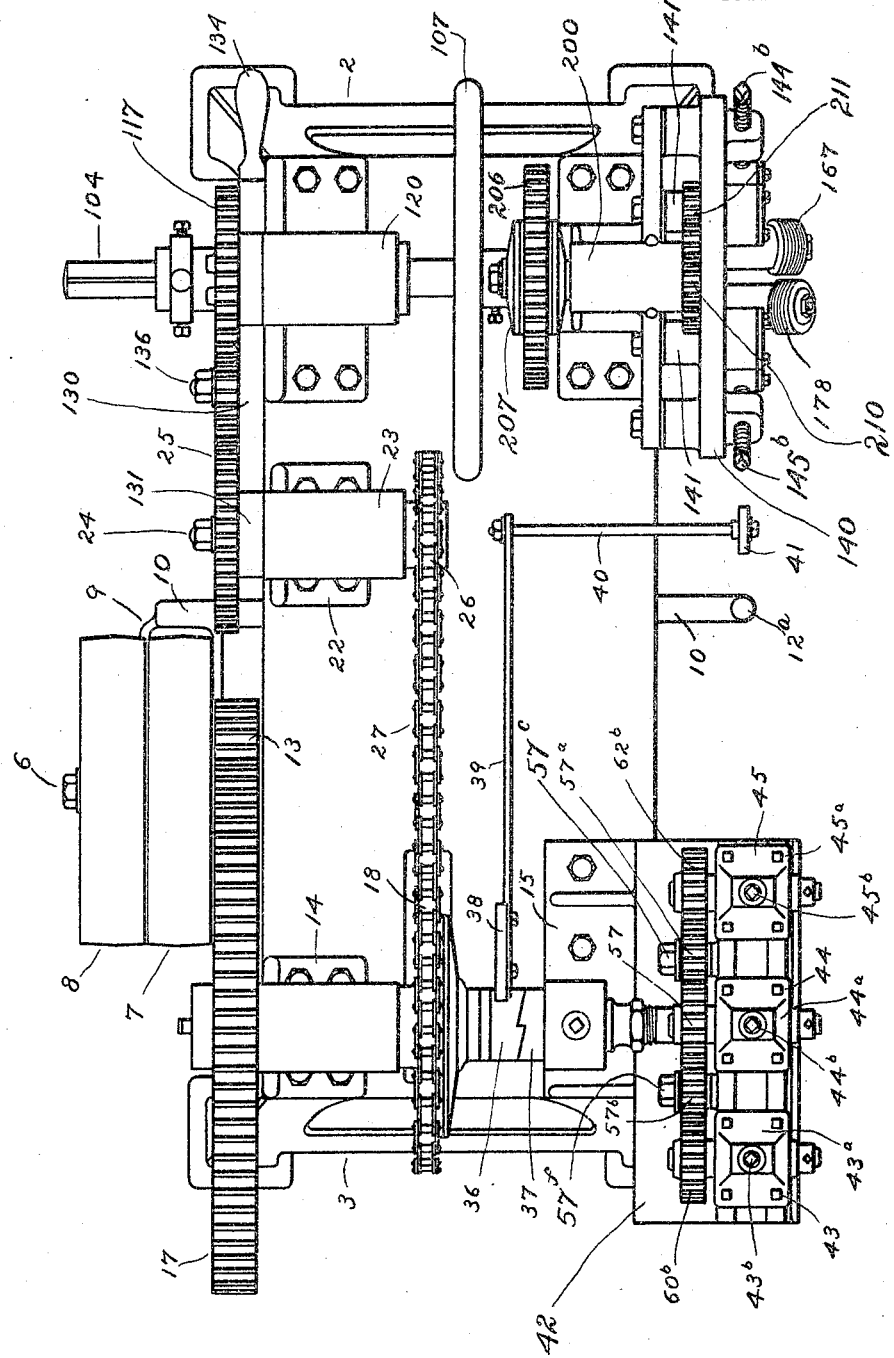
Figure 2:
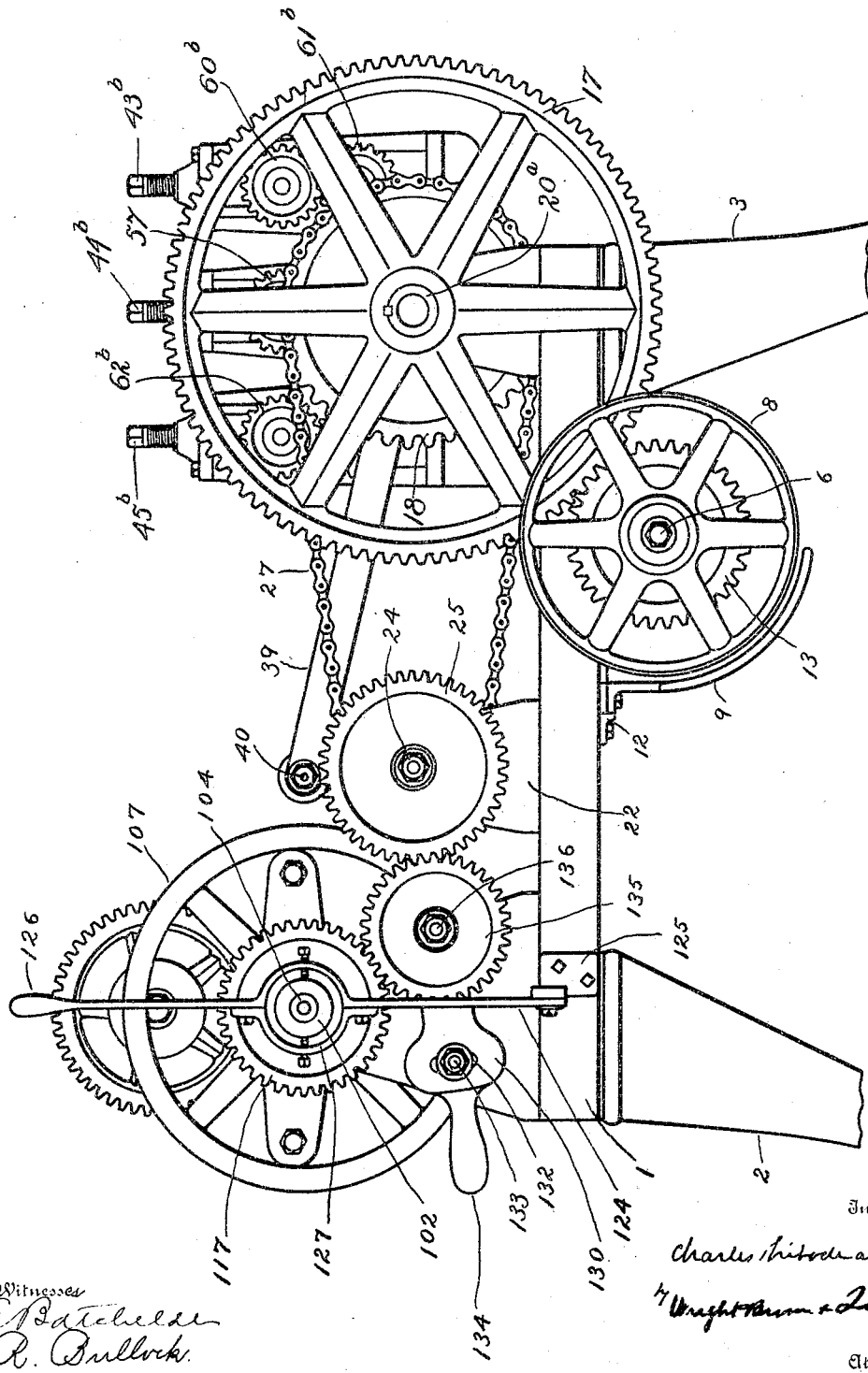
Figure 3:
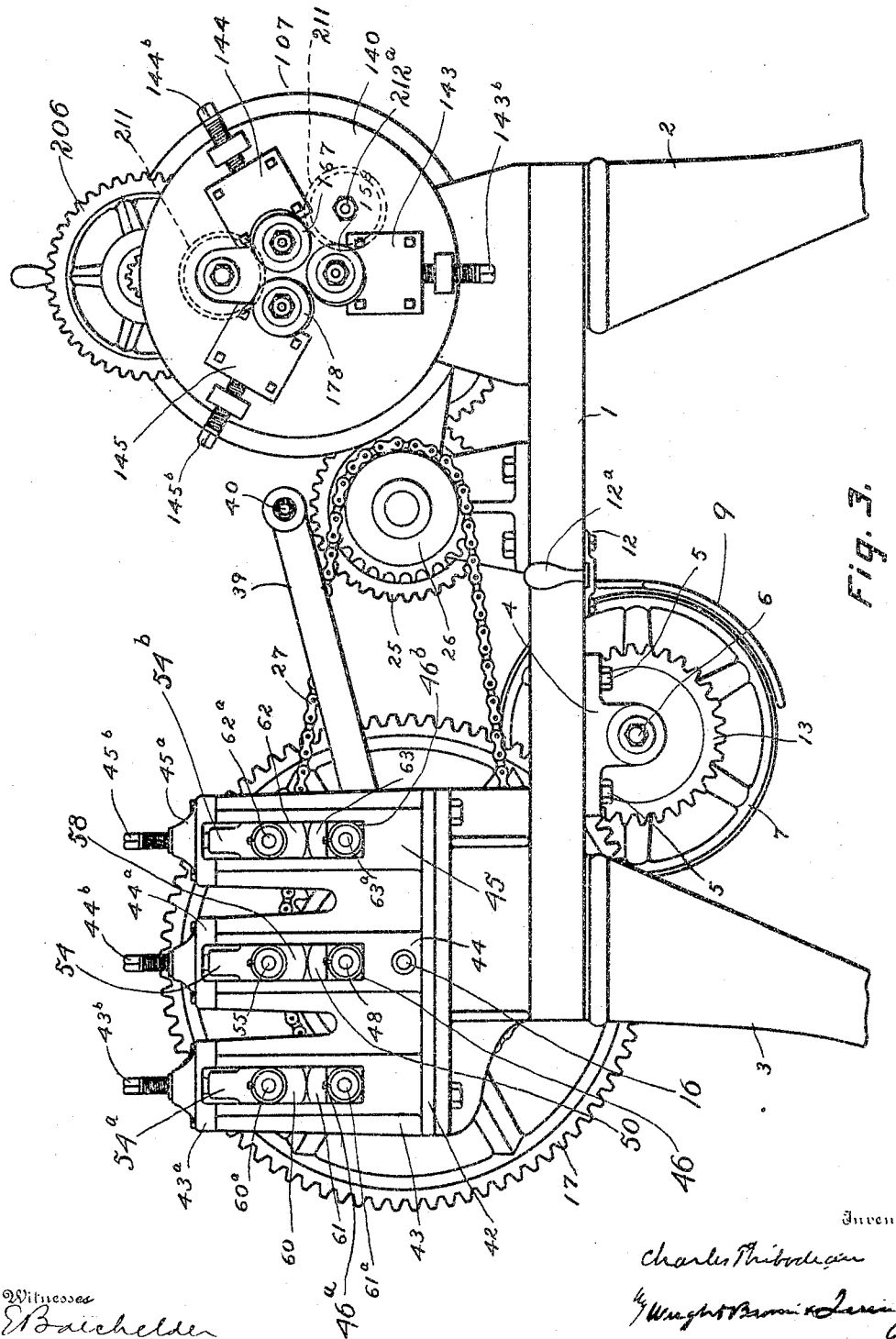
Figure 4:
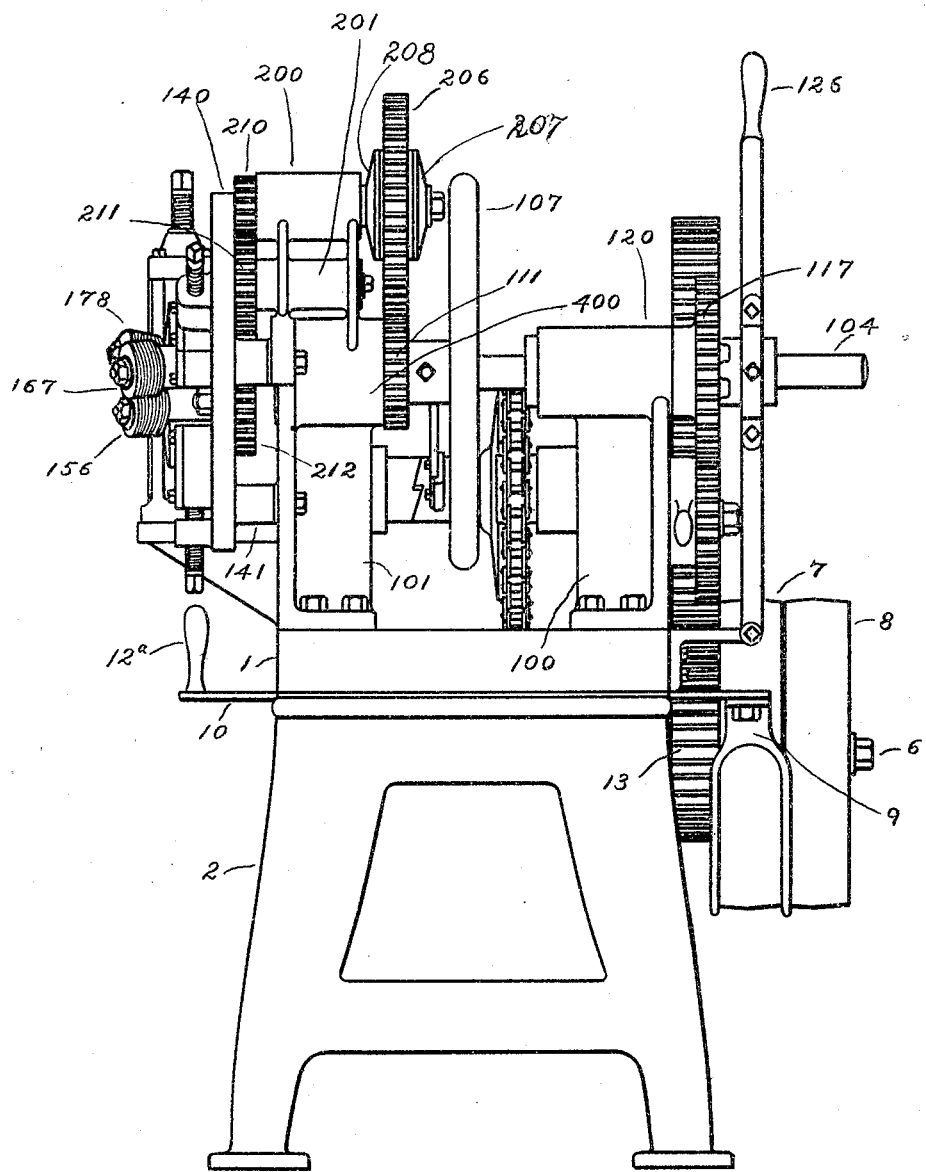
Figure 5:
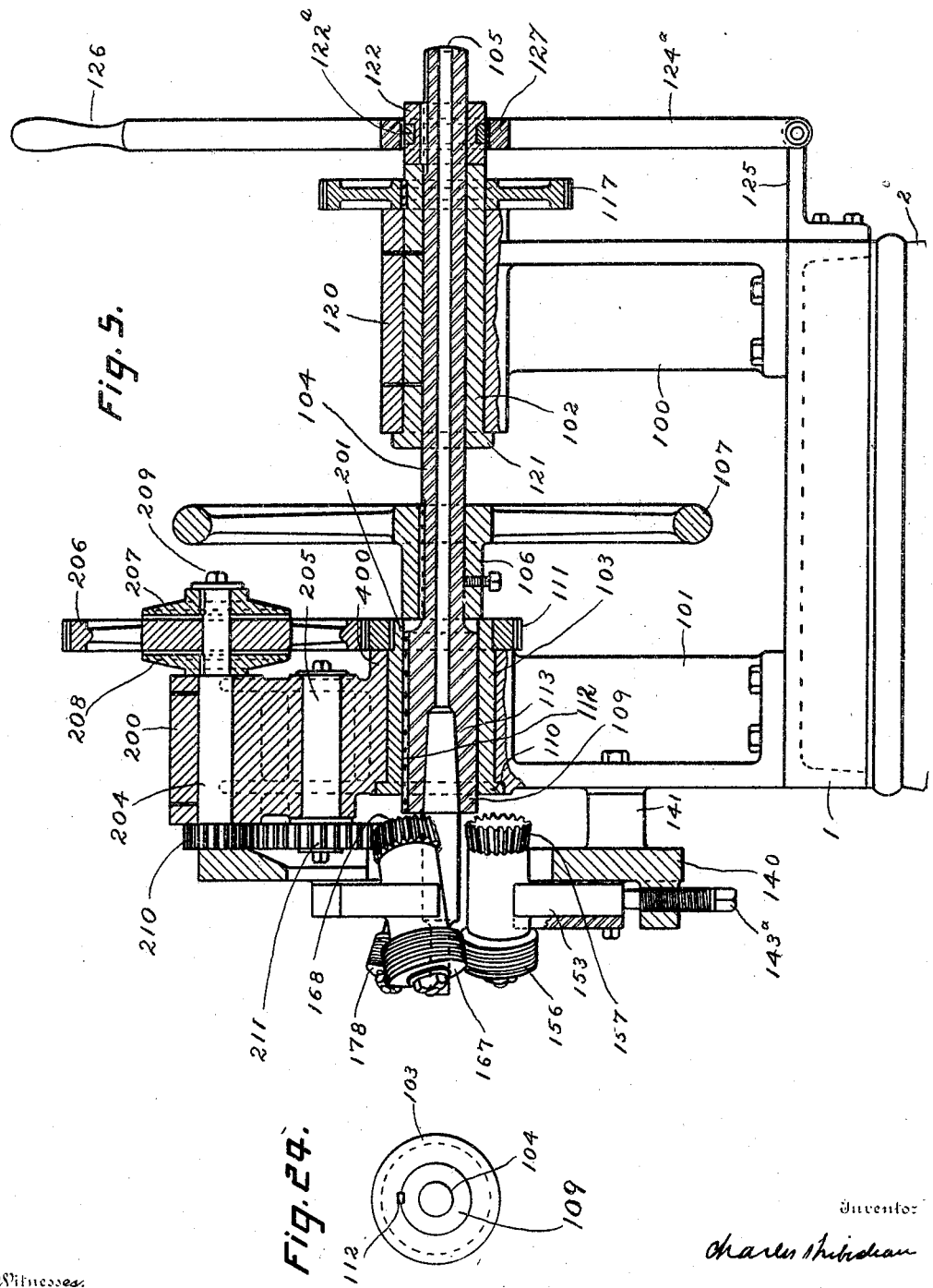
Figure 6:
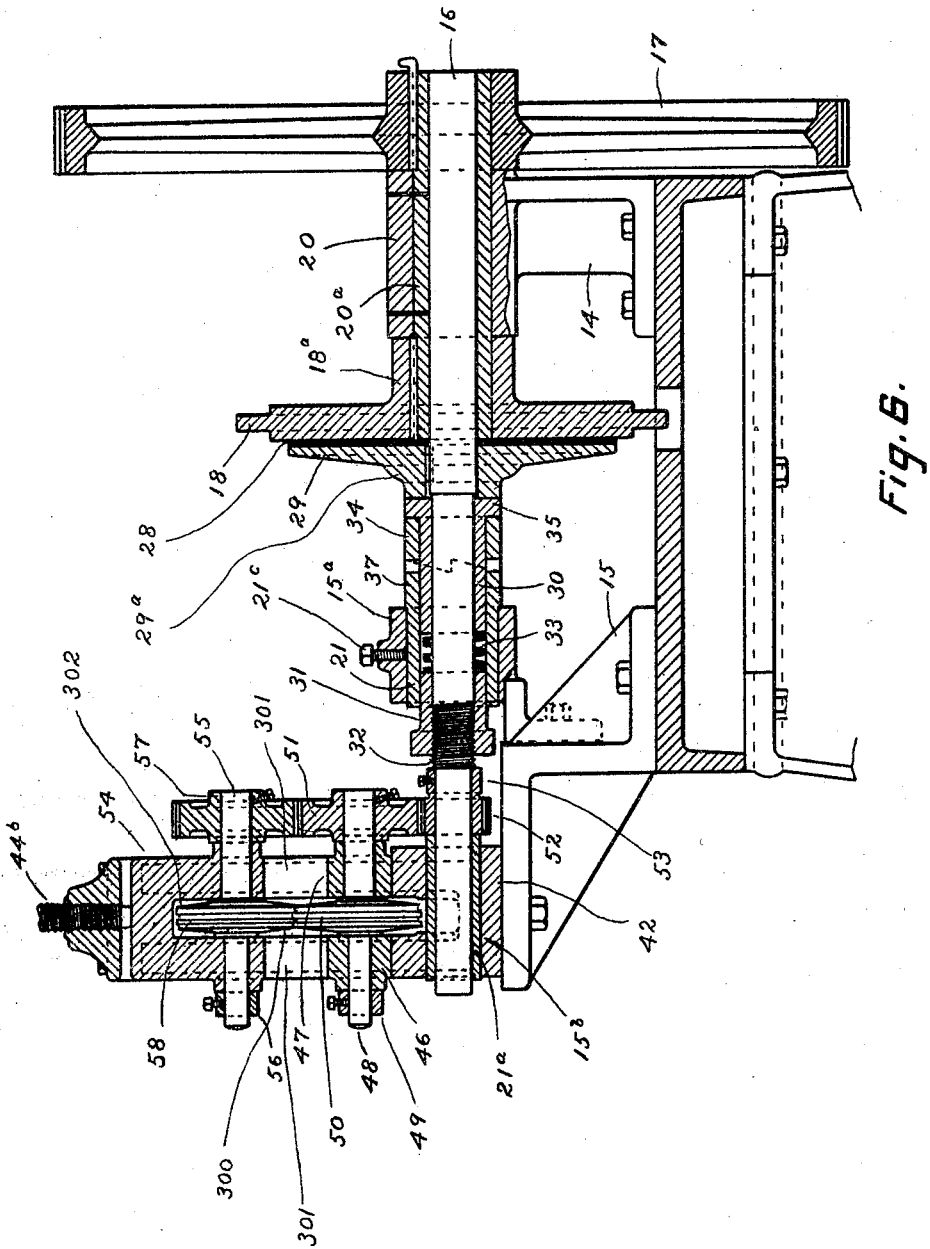
Figure 7:
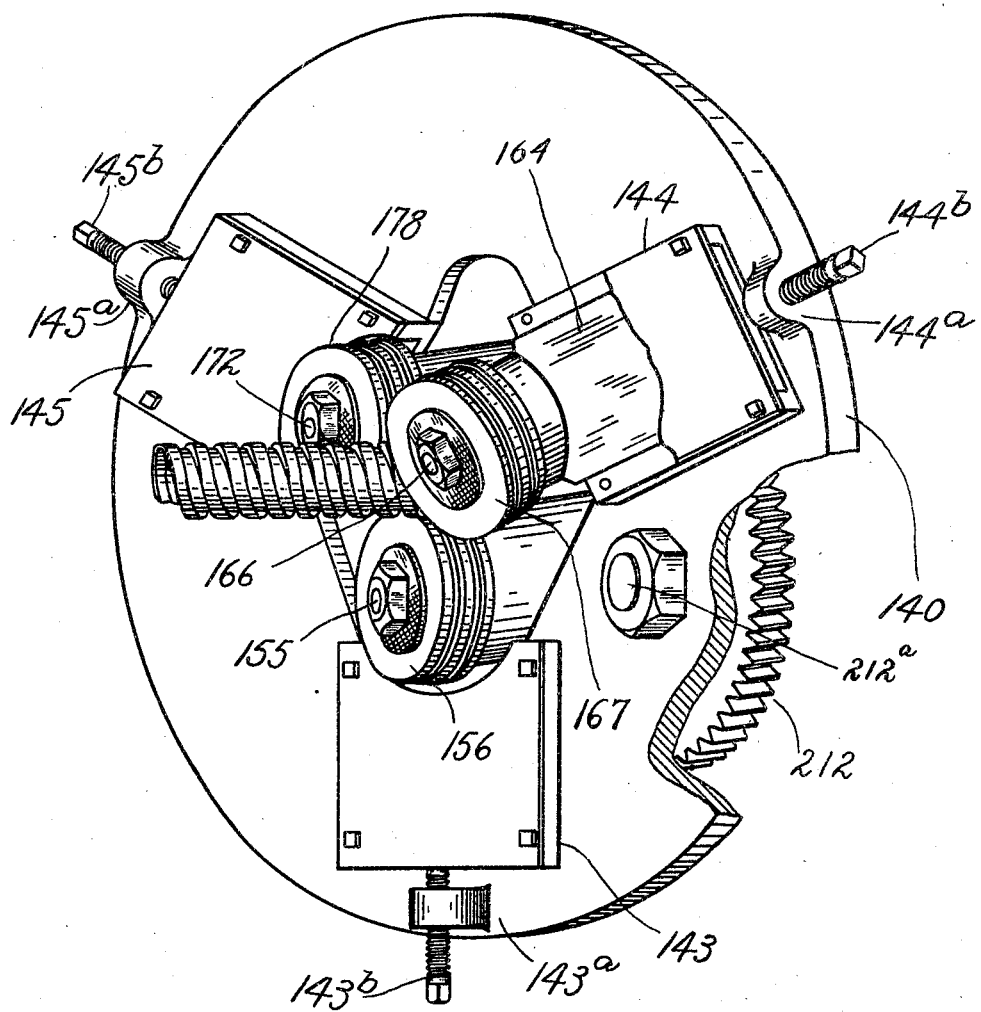
Figures 9, 10:
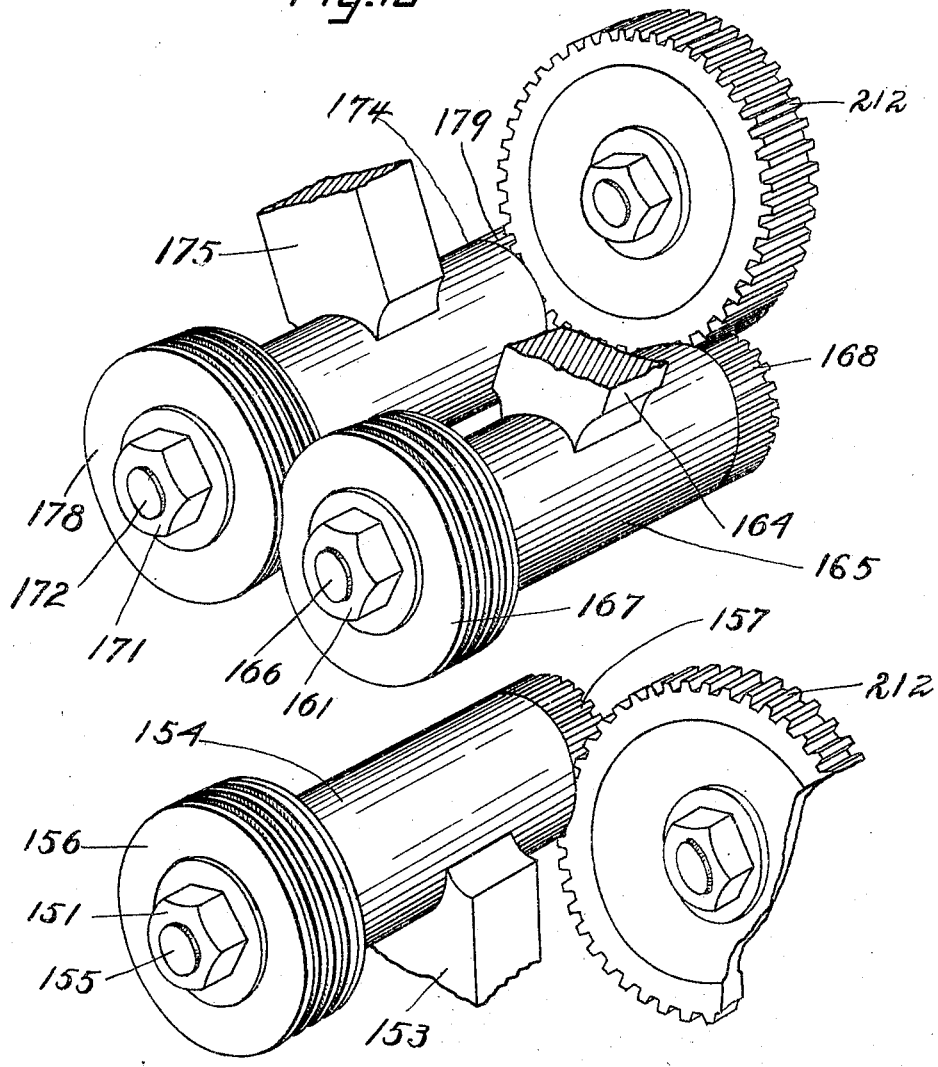

Figure 1 is a top plan view of a machine made in accordance with my invention, showing the head which carries the forming-rolls, also the head which carries the seaming-rolls, the automatic feed-controller, and the driving connections. Fig. 2 is a rear elevation of said machine, showing the connection from the source of power to the main gear on the driving-shaft, also the connections between the driving-shaft and the seaming-shaft. Fig. 3 is a front elevation of said machine, showing at the left the forming-rolls carried by the forming-head and at the right the seaming-rolls carried by the seaming-head, also showing the automatic feed-roll. Fig. 4 is a right-hand end elevation of said machine, showing the seaming-head with its rolls, the hand-wheel on the seaming-shaft, and the clutch by which the seaming-shaft may be disconnected from its driving means. Fig. 5 is a vertical longitudinal sectional view along the seaming-shaft of the machine, showing the arrangement of the mandrel with relation to the seaming-rolls and the gearing by which one of said rolls is driven. Fig. 6 is a similar view along the driving-shaft, showing the arrangement of one pair of forming-rolls, the means by which said rolls are driven, and also showing the clutch mechanism for the automatic feed control. Fig. 7 is a detail view of the seaming-head and its rolls, showing the latter in engagement with the tube as it is being seamed and fed off the mandrel. Fig. 8 is a detail view of the seaming-rolls, showing their positions with relation to each other and the mandrel, the latter (not shown) being inside the tube, the supporting-frameworks being removed to show the position of the rolls, their bearings, and gears. Fig. 9 is a perspective view of the bottom seaming-roll shown in Fig. 8, also showing the bearing for this roll. Fig. 10 is a detail perspective view of the two upper seaming-rolls shown in Fig. 8, also showing the gear by which these two rolls are driven. Fig. 11 is a detail perspective view of an automatic controller-arm and the clutch to which it is connected and by which it is operated. Fig. 12 is a detail perspective view of the clutch on the rear of the machine, whereby the seaming-shaft is disconnected from its driving mechanism. Fig. 13 is a detail view showing in end elevation the three pairs of forming-rolls, the automatic controller-roll, the split end of the mandrel, and also showing the blank in position between the forming-rolls under the tension-roll, the end of the blank being inserted in the split end of the mandrel. Fig. 14 is a detail perspective view of the left-hand or first pair of forming-rolls, showing the blank between them and the work done by said rolls. Fig. 15 is a similar view of the second or middle pair of forming-rolls. Fig. 15$^a$ is a detail cross-sectional view showing the periphery of one of the forming-rolls. Fig. 16 is a similar view of the right-hand or third pair of forming-rolls, Figs. 14, 15, and 16 showing the successive action of the three sets of forming-rolls upon the blank before it reaches the mandrel or the seaming-rolls. Fig. 17 in end elevation shows the mandrel, the first seaming-roll, and the blank in position between the roll and mandrel. Fig. 18 is a similar view showing the mandrel with its formed blank in engagement with two of the seaming-rolls. Fig. 19 is a similar view showing the mandrel with its formed blank in engagement with the three seaming-rolls. Figs. 17, 18, and 19 show the travel of the blank in making one turn about the mandrel. Fig. 20 is a detail perspective view of the mandrel and the first seaming-roll, corresponding to Fig. 17. Fig. 21 is a similar view showing a part of the formed blank as it appears after one turn of the mandrel has been made. Fig.

22 is a detail perspective view showing the mandrel and the formed blank seamed into a tube and partially fed off the mandrel. Fig. 23 is a longitudinal sectional view of a piece of the tubing, showing the form of the joint between successive convolutions or turns. Fig. 24 is a detail view showing the sliding connection between the seaming-shaft and its rotating bearing.

Referring to Figs. 1, 2, 3, and 4, 1 represents a suitable base or bed plate, supported at each end by standards 2 and 3.

Referring to Figs. 2 and 3, 4 represents a bracket formed with a bearing. This bracket is secured by bolts 5 to the under side of the bed-plate. (See Fig. 3.) In the bearings of bracket 4 is arranged a shaft 6, upon which is mounted a tight pulley 7 and a loose pulley 8, adapted to be connected by a belt with any suitable source of power. 9 represents a belt-shifter arranged close to the pulleys 7 and 8 in the usual way and connected with the end of a rod 10, mounted to slide in suitable brackets 12. To the front side of the rod 10 is connected a handle 12ª, by which the belt-shifter may be operated in the usual way. 13 represents a spur-gear. This may be cast integral with the tight pulley 7, so that the pulley 7 and gear 13 rotate together.

Referring to Figs. 1 and 6, 14 represents a standard suitably secured to the top of the bed-plate 1 at the left rear corner of the machine. 15 represents a standard secured in like manner to the top of the bed-plate at the left front corner of the machine. The standard 15 forms a part of what will be hereinafter referred to as the "forming-head." The bracket 14 is formed with a hub 20, in which is arranged a bushing 20ª. The bushing 20ª extends beyond either end of its hub 20. The bracket 15 carries two hubs 15ª 15ᵇ, the latter formed on a plate 42, Figs. 3 and 6. The hubs 20 15ª 15ᵇ are in alinement. In the hub 15ᵇ is arranged a bushing 21ª. In the hub 15ª is arranged a bushing 21, the latter being held in a fixed position by a set-screw 21ᶜ. The bushing 21, as shown, extends beyond its hub 15ª toward the rear of the machine. 16 represents a shaft mounted in the bushings 20ª 21ª as bearings, said shaft being hereinafter referred to as the "driving-shaft." 17 represents a spur-gear splined on the rear end of the bushing 20ª and arranged to mesh with and be driven by the spur-gear 13. 18 represents a sprocket-wheel formed with a hub 18ª, splined upon the forward end of the bushing 20ª. The inner face 28 of the sprocket-wheel 18 is flush with the inner end of the bushing 20ª and is formed inside its teeth as the driving member of a friction-clutch. 22, Fig. 1, represents a bracket secured to the top of the bed-plate on the rear side and near the middle. This bracket at the top carries a hub 23, in which is arranged a shaft 24. 25, Fig. 2, represents a spur-gear rigidly secured upon the outer end of the shaft 24. 26 represents a sprocket-wheel fast upon the inner end of the shaft 24 and in line with the sprocket-wheel 18. 27 represents a sprocket-chain connecting sprocket-wheels 18 and 26, by which power is communicated from the driving-shaft to the gear 25 for purposes hereinafter referred to. 29 represents the driven clutch member complemental to the driving-clutch 28 of the sprocket-wheel 18. The driven clutch member 29 is formed with a hub 29ª, slidingly splined upon the shaft 16 in the usual way, so that the complemental friction members 28 29 may be engaged or disengaged or the degree of their grip or frictional contact varied by a movement of the member 29 toward or away from the member 28.

Referring to Fig. 6, 30 represents a sleeve loosely mounted on the shaft 16 between the hub 15ª and the hub 29ª. The sleeve 30 is of less diameter than the bushing 21, the outer end of said sleeve being arranged in said bushing 21, as shown, and movable lengthwise therein. The rear end of the sleeve 30 is formed with a flange 35, that is arranged in front of and to contact with the front end of the hub 29ª. A sleeve 31 is mounted upon the shaft 16 between the hubs 15ª and 15ᵇ. The sleeve 31 is of the same diameter as sleeve 30. The forward end of said sleeve is formed with a flange 31ª, serving as a nut by which said sleeve may be turned. The rear end of said sleeve is arranged in the bushing 21, thus leaving an annular chamber in the bushing 21 around the shaft 16 and between the opposed ends of the sleeves 30 and 31 occupied by a coiled spring 33. The inner wall of the sleeve 30 is screw-threaded to engage complemental screw-threads upon the shaft 16. By this arrangement the tension of the spring 33 and the endwise thrust of the flange 35 of the sleeve 30 upon the hub 29ª can be adjusted, as desired, by turning the sleeve 31. A sleeve 34 is loosely arranged upon the sleeve 30 between the flange 35 and the rear end of the bushing 21. A cam-face 36 upon the front end of the sleeve 34 is arranged to engage a complemental cam-face 37 on the rear end of the bushing 21.

38, Fig. 1, represents a lug upon the sleeve 34. To this lug is secured an arm 39. In the free end of the arm 39 is secured a rod 40, provided on its free end with a roll 41, that is arranged in the vertical plane occupied by the formed blank in its travel from the forming-rolls to the seaming-rolls hereinafter described.

The cam-faces 36 37 and the arm 39 are shown in Fig. 1 in normal position, in which position the shaft 16 is driven by the thrust of the clutch 29 against the face 28, due to the action of the spring 33. The spring 33 is adjusted to produce less than the ordinary speed at which it is desired to have the shaft 16 travel. The action of the spring 33 upon the collar 35 is supplemented by the action of the cam-faces 36 37, due to the movement of the arm 39, that is controlled by the work, as hereinafter described.

Referring to Figs. 1, 2, and 6, 42 represents a plate secured at the top of the bracket 15 and provided with three standards 43, 44, and 45, said standards and bracket constituting what I term a "head" for the forming-rolls. Each standard 43 44 45 (see Figs. 3 and 6) is formed with a vertical slot 300, running lengthwise of the machine, Fig. 6, and with a vertical slot 301, running crosswise of the machine. The walls of the slots 306 serve for bearings. The slots 300 serve as a recess to provide for the vertical movement of the rolls hereinafter described. A cap $43^a$ is secured over the end of the slot in the standard 43 and is provided with a set-screw $43^b$. The standards 44 and 45 are in a similar manner provided with a cap carrying a set-screw $44^a$ $44^b$ and $45^a$ $45^b$, respectively. Each of the standards 43 44 45 carries a pair of rolls that are substantially duplicates of each other, so far as the mounting is concerned, and hence a description of those shown in Fig. 6 will suffice for the description of all, it being understood, of course, that the periphery of each set of rolls differs from the periphery of the other sets. The section of Fig. 6, being taken along the driving-shaft, shows the middle set of rolls carried by the standard 44.

Referring to Fig. 6, 46 represents a block arranged in the front end of the slot 301 of standard 44, while 47 represents a complemental block arranged in the rear end of said slot. These blocks have a sliding engagement with the slot and can be slid up and down in it. 48 represents a pintle arranged in bearings in the blocks 46 and 47. A collar 49, secured to the outer end of the pintle 48 and engaging the block 46, prevents inward motion of the pintle. 50 represents a roll secured upon the pintle 48 between the two blocks 46 and 47 and arranged in the recess or slot 300, positioned at right angles to the slot 301, carrying the blocks. Upon the rear end of the pintle 48 is secured a spur-gear 51, that meshes with a spur-gear 52, secured on the driving-shaft 16 by a hub 53, integral with the gear. 54 represents a block or bearing arranged in the slot 301 of the bracket 44 above the blocks 46 and 47. The block 54 is provided with a slot 302, corresponding with the slot 300 in the standard, and with two bearings, in which is arranged a pintle 55. (See Fig. 6.) The block 54 is arranged in the slot 301 above the blocks 46 47. 56 represents a collar secured to the outer end of the pintle, by which rearward motion of the pintle is prevented. 57 represents a spur-gear fast on the rear end of the pintle 55 and meshing with the gear 51. 58 represents a roll fast on the pintle 55, arranged in a slot or recess 302 in the block 54. The roll 58 is directly over the roll 50. The two rolls rotate in opposite directions and when engaging a blank not only fashion the blank, but feed it toward the seaming-rolls on the right-hand end of the machine. By means of the set-screw $44^b$, engaging the block 54, the roll 58 may be caused to exert any desired pressure upon the blank.

Referring to Fig. 3, $54^a$ represents the top block of standard 43, and $54^b$ the top block of standard 45, each corresponding to the block 54 of standard 44. A pintle $60^a$ is carried by the block $54^a$, and a pintle $62^a$ is carried by the block $54^b$, corresponding to the pintle 55 of the block 54. The standard 43 carries a block $46^a$. The standard 45 carries a block $46^b$, corresponding to the block 46 of the standard 44. The rear blocks of standards 43 and 45, corresponding to block 47 of standard 44, are not shown. A pintle $61^a$ is carried by the blocks $46^a$ of standard 43, while the blocks $46^b$ of standard 45 carry a pintle $63^a$, corresponding to the pintle 48 of standard 44. $60^a$ and $61^a$ carry complemental rolls 60 61, while pintles $62^a$ $63^a$ carry complemental rolls 62 63. The pressure to be exerted by the rolls 60 61 and 62 63 can be adjusted by means of the set-screws $43^b$ and $45^b$, respectively.

The pintle $60^a$ of the roll 60 is provided with a gear $60^b$, while the pintle $61^a$ of the roll 61 is in like manner provided with a gear $61^b$, (see Fig. 2,) corresponding to the gear 51, Fig. 6. The pintle $62^a$ of the roll 62 is provided with a gear $62^b$, while the pintle $63^a$ of the roll 63 is likewise provided with a gear (not shown) corresponding to the gear 51, Fig. 6, and $61^b$, Fig. 2. Each pair of rolls 60 61 and 62 63 is therefore geared together and turns precisely the same as the pair of rolls 50 58 shown in Fig. 6.

Referring to Fig. 1, an intermediate gear $57^a$, carried by a pintle $57^c$, secured to the rear of the plate 42, meshes with the gear 51 on one side and the gear on the pintle $63^a$ on the other side. An intermediate gear $57^b$, carried by a pintle $57^f$, secured to the rear of the plate 42, also meshes with the gear 51 on one side and the gear on the pintle $61^a$ on the other side, the gear 51 serving not only to drive the pintle 48, but also the pintles $61^a$ $63^a$. The pintles $60^a$, 55, and $62^a$ are driven by their respective gears $60^b$, 57, and $62^b$ when said gears are in engagement with their companion gears beneath them, as shown in Fig. 6. The arrangement is such that the three rolls 61, 50, and 63 turn in the direction of the hands of a watch.

The three pairs of forming-rolls disconnected from the rest of the mechanisms are shown in their respective positions in Fig. 13, from which it will be clear that as the blank 64 passes between each pair of rolls a particular form is given to the blank in cross-section, due to the particular action of the coöperating peripheries of each pair of rolls. The gears of the three pairs of rolls run at the same speed; but the peripheries of the three pairs of rolls run at different speeds, rolls 50 58 having a greater peripheral speed than rolls 60 61 and a less speed than rolls 62 63 to provide for stretch of the material in passing through the rolls. This difference in peripheral speed I secure by making the speed of the middle pair of rolls greater than that of rolls 60 61 and less than that of rolls 62 63.

In Fig. 14 a first pair of rolls 60 61 are shown in edge view. In Fig. 15 a middle pair of rolls 50 58 are shown in edge view. In Fig. 16 the third set of rolls 62 63 are shown in like manner.

Referring to Fig. 14, it will be noticed that the top roll 60 is formed with a peripheral rib 66, while the bottom roll 61 is formed with a complemental peripheral groove 67, the conjoint action of the two rolls not only feeding the blank 64, but also forming in said blank a longitudinal groove 65.

Referring to Fig. 15, the top roll 58 is formed with two parallel peripheral ribs 69 70, each being rectangular in cross-section, separated by a peripheral rectangular-shaped groove 71. The periphery of the roll 58 at the left of the rib 70 in Fig. 15 is cut away, as at 72, to form a depression corresponding to the groove 71. The roll 50 is formed with two peripheral ribs 73 74, each rectangular in cross-section, being arranged, respectively, in the vertical plane of the groove 71 and the depression 72 of the roll 58. The roll 50 between the ribs 73 and 74 is formed with a peripheral groove 75, rectangular in cross-section and arranged in the same vertical plane as the rib 70 of the roll 58. The roll 50 at the right of rib 73 is formed with a peripheral depression corresponding in shape to the groove 75 and arranged in the same vertical plane as the rib 69 in the roll 58. By this construction as the blank leaves the rolls 60 61 and passes through the rolls 50 58 it is not only fed, but its shape in cross-section is changed from that shown in Fig 15 to produce a groove 76, the wall forming the left side of the groove 76 being bent over to form a horizontal flange 77. The wall forming the right side of the groove 76 is bent over to form a horizontal flange 78, the edge of the flange 78 being bent downward to form a forwardly-projecting lip 79, the right wall of the groove 76, flange 78, and lip 79 forming a second groove 80.

Referring to Fig. 16, the top roll 62 is formed with a peripheral rib 81, rectangular in cross-section. The bottom roll 63 is formed with a complemental peripheral groove 83, lying in the same vertical plane as the rib 81 of the roll 62. On either side of the groove 83 roll 63 is formed with a rectangular-shaped rib 84 85. To the right of the rib 85 in Fig. 16 roll 63 is formed with a peripheral rib 87, the inner wall 88 of which is beveled, as shown, thus forming a peripheral groove 86, having a beveled wall. As the blank leaves the rolls 50 58 and passes through the rolls 62 63 it receives the form in cross-section shown in Fig. 16, the chief office of the third set of rolls being to turn in the lip 79 toward the under side of the blank, as shown. This gives the blank its finished form and provides the interlocking member or flange 79.

Referring to Figs. 1, 2, 3, 4, and 5, 100 represents a bracket secured to the top of the bed-plate 1 at the rear right-hand corner of the machine. 101 represents a complemental bracket secured to the top of the bed-plate 1 at the front right-hand corner of the machine. 120 represents a hub formed on the upper end of the bracket 100. In this hub is arranged a rotatable sleeve 102, formed with a flange 121, that prevents rearward motion of said sleeve. The bracket 101 is formed with a hub 400, Fig. 4, corresponding to the hub 120 and in line with the same. In the hub 400 is arranged a rotatable sleeve 103, formed with a flange 110, that prevents rearward motion of said sleeve. 104 represents the seaming-shaft, which, as shown, is formed with a hollow bore 105 and with an enlargement or head 109, the head 109 being arranged in the sleeve 103 as a bearing, while the shaft 104 at the rear of the machine is arranged in the sleeve 102 as a bearing. 111 represents a spur-gear rigidly secured to the rear end of the sleeve 103 just outside of the hub 400. The head 109 is connected to the sleeve 103 by means of a spline 112, Fig. 24, so that while the shaft may be slid in and out of said sleeve the two rotate together at all times. 107 represents a handwheel formed with a hub 106, arranged upon and secured to the shaft 104 between the sleeves 102 and 103. The hub 106 is positioned to limit the movement of the shaft and head 109 toward the front to a predetermined point irrespective of the rearward movement of said shaft and head. 113 represents a mandrel secured in the central bore of the head 109. This mandrel can be driven out at any time by means of a tool inserted through the bore 105. The mandrel 113 is formed at its free end with a reduced part 114, Fig. 13, ending in an inclined shoulder 115, Fig. 20. The front end of the reduced part 114 of the mandrel 113 is formed with a slot 116 to receive the end of the blank 64 for purposes hereinafter described.

117, Figs. 5 and 12, represents a spur-gear rigidly mounted on the rear end of the sleeve 102. The gear 117 on the rear end of the sleeve 102 engages the bearing 120 and prevents the forward movement of said sleeve.

122 represents a sliding clutch member on the outer end of the shaft 104, formed upon its inner face with clutch-teeth 123, adapted to engage complemental clutch-teeth 124 in the rear end of the sleeve 102.

124ª represents a lever pivoted at its lower end to a bracket 125, carried by the right rear quarter of the bed-plate. The upper end of this lever is formed with a handle 126. The lever midway its ends is formed as a strap 127, arranged around the clutch member 122. The strap 127, by means of bolts 127ª, carries a ring 122ª, arranged in a complemental groove in the periphery of the clutch member 122. By means of the lever 124ª the shaft 104 can be connected to or disconnected from the sleeve 102. The hand-wheel 107 furnishes a means by which the shaft 104 and the mandrel 113 may be turned by hand. In starting the machine the shaft 104 and mandrel 113 are pulled rearward by means of the hand-wheel until the slot 116 is brought back over the inner ribs of the seaming-rolls hereinafter described. The end of the formed blank 64 is inserted in the slot 116. (See Fig. 20.) By turning the hand-wheel the shaft 104 and mandrel 113 are rotated, winding the blank onto the mandrel through the seaming-rolls. This operation not only seams the blank, but feeds the shaft and mandrel forward until the hub 106 strikes the sleeve 103. Further forward motion of the mandrel being stopped, the continued rotation of the mandrel and seaming-rolls seams the blank and feeds the finished tube off the mandrel. The hub 106 is positioned to bring the slot 116 in proper relation to the seaming-rolls when the machine is run by power and not by the hand-wheel.

Referring to Figs. 1 and 2, 130 represents a lever situated on the rear right-hand end of the machine. The left-hand end of this lever is formed with an enlargement 131, pivoted on the shaft 24. (See Fig. 1.) The front end of this lever is formed with an arc-slot 132, whose center is the shaft 24. 133 represents a bolt carried by the bracket 100, arranged in the arc-slot 132. 134 represents a handle on the right-hand or front end of the lever 130. By loosening the bolt 133 the lever may be moved up and down by means of the handle 134 and secured in any desired position of adjustment. 135 represents a spur-gear arranged on a pintle 136, carried by the lever 130. This gear, as shown, meshes with the gear 25 and also with the gear 117. The gear 135 is changed for a larger or smaller gear, depending upon the size of the tubing to be made. This change of gears is compensated for and the engagement of the gear 135 with the gears 25 and 117 is secured by the lever 130.

Referring to Figs. 1, 3, 4, 5, and 7, 140 represents a flat ring secured on the front of the bracket 101 by means of studs or bolts 141, the mandrel 113 being arranged in the center of said ring. 143, 144, and 145 represent three boxes secured upon the front side of the ring 140 about the central aperture of the latter, said boxes being arranged at equal distances from each other—in other words, one hundred and twenty degrees apart. This distance, however, may be varied to suit the requirements of different kinds of work. Outside of each box 143 144 145 is arranged a threaded lug 143ª 144ª 145ª, respectively. In each of these lugs is arranged a set-screw 143ᵇ 144ᵇ 145ᵇ, respectively.

Referring to Fig. 9, 153 represents a slide arranged in the box 143 and adapted to be engaged at its outer end by the screw 143ᵇ. The slide 153 carries at its inner end a bearing 154, in which is arranged a short shaft 155. 156 represents a roll secured on the front end of said shaft by a nut 151. 157 represents a spur-gear secured on the rear end of said shaft. 164 represents a slide arranged in the box 144, carrying at its inner end a bearing 165. 166 represents a short shaft arranged in the bearing 165. Upon the front end of this shaft is secured a roll 167 by a nut 161. Upon the rear end of this shaft is secured a spur-gear 168. In the box 145 is arranged a slide 175, the inner end of which carries a bearing 174. In this bearing is arranged a short shaft 172. 178 represents a roll secured on the front end of said shaft by means of a nut 171. 179 represents a spur-gear secured upon the rear end of said shaft. The shafts 155, 166, and 172, as shown, are not only arranged at an angle to each other, but also to the axis of the mandrel 113. This necessitates a shaping of the teeth of the gears 157, 168, and 179, depending upon the degree of such angular arrangement. It will be understood that the rolls 156, 167, and 178 are situated at a distance of one hundred and twenty degrees from each other about the mandrel 113. Further, by means of the set-screws 143ᵇ, 144ᵇ, and 145ᵇ each of these rolls can be given an independent adjustment toward the mandrel in order to cause each roll to exert the desired pressure upon the blank as it is wrapped around the mandrel.

The ring 140 and the parts carried thereby I term the "seaming-head," the rolls 156, 167, and 178 being referred to as the "seaming-rolls," their function being to engage the blank about the mandrel 113 and interlock or seam the edges to form the tube, the rolls serving also to feed the finished tube off the mandrel.

Referring to Figs. 1, 4, and 5, 200 201 represent two hubs connected together and in turn carried by and connected to the hub 400. In the hub 200 is arranged a short shaft 204, while in the hub 201 is arranged a short shaft 205. 206 represents a spur-gear, the hub of which is loosely mounted on the rear end of the shaft 204. 207 208 represent two friction-clamps splined to the rear end of the shaft 204 on either side of the hub of the spur-gear 206. 209 represents a nut arranged upon the rear end of the shaft 204. The clamp 208 has no motion on the shaft, while the clamp 207 can move toward or away from the hub of the spur-gear. By means of the nut 209 any desired friction can be produced by the arrangement of the clamps with the hub of the spur-gear, thus allowing for variations, pressure, or resistance between the seaming-rolls and the blank to prevent the breaking of the parts. The spur-gear 206 meshes with the spur-gear 111. On the front end of the shaft 204 is secured a pinion 210, that meshes with an idle or intermediate pinion 211, fast on the inner end of the shaft 205. The intermediate pinion 211 (see Figs. 5 and 10) meshes with the pinions 168 179. 212 represents an intermediate pinion secured on the inside of the ring 140 by a stud 212ª. (See Figs. 3 and 7.) This intermediate pinion 212 meshes with the pinion 168 on the second roll 167 and also with the pinion 157 on the first roll 156. (See Fig. 8.) By this means the three seaming-rolls 156, 167, and 178 are given their movement of rotation.

The operation of my improved machine is as follows: In starting the machine after sufficient of the blank has been formed to extend to the mandrel the clutch 122 is unlocked, the winding-shaft pushed to the rear, so that the slot in the end of the mandrel will be in line with the plane of the blank and the rolls. The blank is then inserted in the slot in the end of the mandrel, and the hand-wheel is rotated until one complete turn of the blank about the mandrel has been made. During this operation (see Figs. 20 and 21) it will be seen that the rear rib in the roll 156 engages the groove 76 of the blank at an angle, while the parts of the roll 156 on either side of said rib engage the parts of the blank on each side of said groove 76. By this construction and arrangement as the mandrel turns the bottom roll 156 causes the blank to conform to the mandrel, the degree of conformity or tightness being determined by the pressure applied to the roll. The continued rotation of the mandrel brings the blank into engagement with the roll 167, said roll being likewise arranged at an angle to the axis of the mandrel. This roll is likewise shaped to conform to the contour in cross-section of the blank, and, further, conforms the blank to the mandrel. The further rotation of the mandrel brings the blank into engagement with the roll 178. This roll has its periphery shaped to conform to the cross-section of the blank and engages said blank after the manner of the other rolls and is likewise set at an angle to the axis of the mandrel. The engagement of the rolls with the blank not only conforms the blank to the mandrel, but also, due to the position of the rolls with respect to the mandrel and the engagement of the rolls with the ribs of the blank, feeds the articulated tube or finished work from the mandrel, as will be evident from an inspection of Fig. 21. In practice during one turn of the mandrel the shaft 104 is pulled forward by the action of the rolls and the blank gripping the mandrel until the hub 106 strikes the gear 111. Thereafter, power being applied to the seaming-shaft by means of the clutch 122, the seaming-rolls not only spin the blank in place and lock its edges, but also feed the tube off the mandrel, the latter in such case being fixed against forward movement, the feeding action of the seaming-rolls in that case resulting in feeding the tube off the mandrel rather than, as in making the first turn, feeding the mandrel itself with the tube on it forward. Referring to Figs. 1, 2, 3, 6, 11, and 12, power being applied to the machine, the gear 17 is rotated by reason of its engagement with the gear 13, thus rotating the sprocket-wheel 18, while by means of the sprocket-chain 27, the gears 25, 135, and 117 the rotation of the seaming-shaft and parts driven therefrom is effected. The rotation of the sprocket-wheel 18 by means of clutch members 28 29 and the intermediate gears rotates the forming-rolls. As the blank 64 is engaged by the rolls 60 and 61 (see Figs. 13 and 14) the blank is fed forward and formed with the groove 65. The middle set of forming-rolls 50 58 engaging said blank supplements said forward feed and gives to the blank the shape and cross-section shown in Fig. 15. Thereafter the blank is engaged by the third or right pair of forming-rolls 62 63, which supplements the forward feed and gives to the blank the shape and cross-section shown in Fig. 16. It is to be understood that each pair of forming-rolls is positively driven in unison, and the pressure upon each pair of forming-rolls can be varied as desired. The described action of the forming-rolls results in the continuous production of a blank whose cross-section is as shown in Fig. 15. A like blank of any desired cross-section can be produced by suitable rolls. Referring again to Figs. 17 to 21, it will be seen that the ribs and grooves of the seaming-rolls 156, 167, and 178 conform to the ribs and grooves of the blank and that the axis of each seaming-roll is arranged at an angle to the axis of the mandrel. This gives to the ribs on the seaming-rolls, in addition to their seaming or locking action, a screw-feed action on the finished tube. After the blank has made one complete turn on the mandrel the further rotation of the mandrel, due to the construction of the blank, the position and formation of the periphery of the seaming-rolls causes the lip 79 to be placed in the groove 76, so that as the mandrel revolves the rib on the rolls causes said lip 79 to be continuously positioned in said groove 76, while the groove 80 receives the flange 77. It will be understood, of course, that each pair of the seaming-rolls is positively driven in unison, and its pressure can be varied as desired. As the machine continues its operation the formed blank is continuously fed to the seaming-rolls and continuously spun about the mandrel 113 as a tube, having the lip 79 in the groove 76 and the flange 77 in the groove 80, the action of the seaming-rolls, in connection with the mandrel and blank, not only spinning the blank onto but also feeding the completed tube off the mandrel. The action of the machine is automatic and continuous, the machine making conduits or tubes of any desired length, diameter, or form of joint or articulation. If for any reason the forming-rolls feed the blank to the seaming-rolls faster than it is used up by them, a slack in the blank between the mandrel and the right pair of forming-rolls, Fig. 13, will be made. This will cause the tension-roll 41 to drop. Such action of the tension-roll (see Fig. 1) causes the rotation of the sleeve 34. (See Figs. 1, 6, and 11.) This causes the cam-face 36 to turn to the right, Fig. 1, thus decreasing or removing the grip of the clutch members 28 29 on the sprocket-wheel, due to the action or thrust of the sleeve 34 upon the flange 35, resulting in a decreased speed of the driving-shaft and forming-rolls, which will continue until the slack is taken up and the roll 41 returned to its predetermined position, when the cam-faces 36 37 are engaged, resulting in an endwise thrust of the sleeve 34 against the flange 35, supplementing the action of the spring 33. The action of the sleeve 34, as well as the action of the spring 33, may be adjusted as desired. This relative speed between the seaming-rolls and forming-rolls can be adjusted as desired. The tension-roll 41 does not act as a stop, but as a speed-controller.

It will be evident that by reason of the fact that the forming-rolls and seaming-rolls are positively driven and, further, because of the fact that the forming-rolls act as feeding-rolls there is no strain brought to bear on the mandrel or the seaming-rolls except for the formation of the tube and the feeding of the latter from the rolls, there being no strain such as would exist were the mandrel required to draw or pull the blank through the forming mechanism, whether of rolls or dies. The forming-rolls and the seaming-rolls are positively driven, as distinguished from being turned by a blank drawn through them.

It will be evident that blanks of various dimensions and material can be employed and that tubes of various diameters can be made, depending upon the character of the material, the kind of tube desired, size of mandrel, &c., and, further, that the form of the joint or articulation can be varied, depending upon the form given to the blank, which can be varied as desired, the periphery of the forming-rolls being made to agree with the form into which it is desired to make the blank, the size of the mandrel, and form of seaming-rolls being made to conform to the particular tube it is desired to make. I have found also that when the material is of sufficient resiliency the seaming-rolls can be used without the aid of the mandrel.

The product of the machine when finished I may use as an independent tube or as a protection or covering. In the latter case the tube may be drawn over the article it is intended to cover, or it may be seamed about said article, the latter being fed through a suitable opening in the shaft 104 corresponding to the opening 105. When seaming the tube as a covering for an article that is fed through the shaft 104, ordinarily no mandrel will be required.

Having thus explained the nature of my invention and described a way of making and using the same, although without attempting to set forth all of the forms in which it may be made or all the modes of its use, what I claim, and desire to secure by Letters Patent, is—

1. In combination with the coöperating elements of a machine for making spiral tubing, a series of forming-rolls, arranged to form interlocking members upon a strip of metal, a series of seaming-rolls arranged to spin said strip in a spiral manner to form a tube and seam the edge of contiguous convolutes or turns, and means for positively driving said rolls.

2. In combination with the coöperating elements of a machine for making tubing, a series of seaming-rolls, and means for driving said rolls including a friction member arranged to slip upon the application of excessive strain upon said rolls.

3. In combination with the coöperating elements of a machine for making tubing, a series of seaming-rolls having their operative faces arranged at an angle to the axis of the tube seamed thereby, and means for positively driving said rolls, whereby said rolls seam and feed the finished tube.

4. In combination with the coöperating elements of a machine for making tubing, a series of forming-rolls, means for driving said rolls, and means controlled by the work for regulating the action of said roll-driving means.

5. In combination with the coöperating elements of a machine for making tubing, a series of forming-rolls, and means for positively driving said rolls arranged to slip on the application of excessive strain.

6. In combination with the coöperating elements of a machine for making tubing, a series of positively-driven forming-rolls, a series of coacting seaming-rolls, and means controlled by the work for controlling the speed of one of said sets of rolls with relation to the other.

7. In combination with the coöperating elements of a machine for making tubing, a series of positively-driven forming-rolls, a mandrel, and a coöperating series of positively-driven seaming-rolls arranged about said mandrel.

8. In combination with the coöperating elements of a machine for making tubing, means for forming a blank, means for seaming said blank to form a tube, and means controlled by the seaming means for regulating the speed of the forming means.

9. In combination with the coöperating elements of a machine for making tubing, means for forming a blank, means for seaming said blank to form a tube, and automatically-acting means for varying the speed of the forming means with relation to the speed of the seaming means.

In testimony whereof I have affixed my signature in presence of two witnesses.

CHARLES THIBODEAU.

Witnesses:
   R. BULLOCK,
   E. BATCHELDER.